United States Patent Office 3,272,741
Patented Sept. 13, 1966

3,272,741
WELL COMPLETION OR WORKOVER FLUID
John S. Brukner, Houston, and Charles C. Nathan, Bellaire, Tex., assignors to Texaco Inc., New York, N.Y., a corporation of Delaware
No Drawing. Filed Mar. 29, 1962, Ser. No. 183,361
11 Claims. (Cl. 252—8.55)

This application is a continuation-in-part of our copending application Serial No. 856,921, filed December 3, 1959, now abandoned.

This invention relates to well completion or workover fluids and, more particularly, to aqueous well completion or workover fluids for use in well treating operations.

In a well treating operation, or in a well completion operation, it is desirable to employ a fluid which does not impair the permeability or productivity of the petroleum producing formations penetrated by the well bore. More particularly, in a well treating operation it is desirable to employ as the well treating fluid a fluid which does not swell and/or hydrate shaley material in the formations undergoing treatment. To this end it has been the practice heretofore to employ as workover fluids brines, such as aqueous solutions of calcium chloride or sodium chloride or mixtures thereof which do not hydrate or swell shaley material in contact therewith. One disadvantage, however, of employing this type of completion fluid is that it is relatively difficult to obtain a relatively high density fluid without adding or incorporating in such fluids solid materials such as clay and weighting materials, e.g., barium sulfate. When clayey material and other finely divided weighting material is dispersed and incorporated in such treating fluids the finely divided solid particles therein tend to penetrate the interstices of the formation undergoing treatment and to seal off these formations or reduce the permeability and fluid productivity thereof.

Accordingly it is an object of this invention to provide an improved well completion or workover fluid.

Another object of this invention is to provide a substantially solids-free, e.g., clay-free, fluid which not only inhibits the hydration of shaley material in contact therewith but which also tends to solidify and harden these materials and render these materials more competent.

It is another object of this invention to provide an improved aqueous well completion or workover fluid which is readily adaptable to variation in specific gravity.

Still another object of this invention is to provide a solids-free aqueous well completion fluid having a variety of certain desirable properties, e.g., capable of having a relatively high density, inhibiting corrosion, inhibiting shale hydration or swelling.

How these and other objects of this invention are accomplished will become apparent in the light of the accompanying disclosure. In at least one embodiment of the practice of this invention at least one of the foregoing objects will be achieved.

The well completion or workover fluid of the present invention comprises an aqueous solution of a water soluble inorganic chromate or polychromate compound, including mixtures thereof, said inorganic chromate being present in the solution in an amount of at least about 15 percent by weight, based on the weight of the solution.

Water soluble chromate and polychromate salts useful for the preparation of the well completion or workover fluids of the invention include potassium chromate ($K_2CrO_4$), lithium chromate ($Li_2CrO_4$), lithium chromate ($Li_2CrO_4 \cdot 2H_2O$), sodium chromate ($Na_2CrO_4$), ammonium chromate [$(NH_4)_2CrO_4$], ammonium dichromate [$(NH_4)_2Cr_2O_7$], sodium dichromate ($Na_2Cr_2O_7 \cdot 2H_2O$), sodium dichromate ($Na_2Cr_2O_7$), sodium trichromate ($Na_2Cr_3O_{10} \cdot H_2O$), potassium dichromate ($K_2Cr_2O_7$), calcium dichromate ($CaCr_2O_7 \cdot 4.5H_2O$), sodium tetrachromate ($Na_2Cr_4O_{13} \cdot 4H_2O$), calcium chromates $CaCrO_4$ anhydrous, 0.5, 1 and $2H_2O$), lithium dichromate ($Li_2Cr_2O) \cdot 2H_2O$), sodium chromate $$(Na_2CrO_4 \cdot 4H_2O)$$

sodium chromate ($Na_2CrO_4 \cdot 6H_2O$), sodium chromate ($Na_2CrO_4 \cdot 10H_2O$), magnesium chromate $$(MgCrO_4 \cdot 5H_2O)$$

and magnesium chromate ($MgCrO_4 \cdot 7H_2O$).

Any water soluble inorganic chromate or polychromate salt (dichromate, trichromate, tetrachromate) or mixtures thereof may be employed in the preparation of aqueous well completion fluids in accordance with the practice of this invention provided the salt or salts are compatible with the aqueous environment in which it is incorporated. For example, if an aqueous solution comprising lime and a water soluble chromate or polychromate was prepared in accordance with the practice of this invention, a magnesium chromate would not be employed since by metathetical reaction with the lime extremely water insoluble magnesium hydroxide would be formed, thereby effectively taking the hydroxyl ion out of solution along with any resulting beneficial properties the hydroxyl ion may impart thereto.

Other chromates which are satisfactorily employed in the practice of this invention include the double salts of chromates and/or dichromates which have the formula $$M_2{}^a0.4M^bO \cdot 4CrO_3 \cdot 3H_2O$$

where $M^a$ and $M^b$ are potassium and copper, potassium and cadmium, potassium and cobalt, $NH_4$ and cadmium, and $NH_4$ and cobalt, respectively. Other corresponding double salts, sodium in the place of potassium, are known.

In the preparation of well completion fluids in accordance with this invention, water soluble chromate or polychromate sufficient to impart the desired improved properties to the finished well completion fluid may be employed. An amount of a water soluble chromate or polychromate sufficient to provide a chromate concentration of at least 15 percent and preferably 20 to 66 percent is used to attain the desired improvement in the well completion fluid. Saturated solutions of water soluble chromates or polychromates may be employed to attain the density desired in the finished treating or well completion fluid.

The water soluble chromates or polychromates may be directly dissolved or incorporated in water to yield the finished treating solutions or may be directly dissolved or incorporated in aqueous brines, e.g., formation brines. Brines containing a water soluble chromate or polychromate are particularly useful since brines, i.e., aqueous solutions containing sodium chloride and/or calcium chloride, do not tend to hydrate or swell shaley materials and this property is further enhanced by the presence of a water soluble chromate or polychromate therein. If a brine solution, or a solution containing another water soluble salt such as sodium nitrate, calcium nitrate, calcium sulfate, zinc chloride is employed the amount of such salt therein should be present in a significant amount, such as in an amount of at least about 1 percent by weight of the resulting solution.

Of particular interest in the practice of this invention are well treating fluids or well completion fluids which not only have incorporated therein a satisfactory and sufficient amount of a water soluble chromate or polychromate but which also possess an aqueous phase characterized by a relatively high calcium ion concentration, at least about 200 p.p.m., such as a calcium ion concentration in the range 1000–2000 p.p.m. Desirably also the aqueous phase is saturated with calcium hydroxide. Aqueous well completion fluids having the above compositions in accordance with this invention are particularly useful when a petroleum producing formation containing shaley material or shaley streaks is undergoing treatment and in contact with the well completion fluid. Well completion fluids having an aqueous phase saturated with calcium hydroxide and having a relatively high calcium ion concentration, at least about 200 p.p.m., exhibit the desirable property of shale hardening, i.e., in addition to preventing the swelling of shaley materials also renders these materials hard and more competent.

Satisfactory well completion fluids in accordance with this invention are as follows:

A concentrated aqueous solution, e.g., 60 percent by weight of calcium dichromate ($CaCr_2O_7 \cdot 4.5H_2O$) having a density of 14.2 lbs. per gal.

A saturated (85° F.) aqueous solution of sodium dichromate ($Na_2Cr_2O_7 \cdot 2H_2O$) having a density of about 21 lbs. per gal.

Satisfactory well completion fluids having densities above about 9.0–9.5 lbs. per gal. are prepared by dissolving in aqueous sodium chloride solutions having a density of about 9.0 lbs. per gal. suitable amounts of lithium chromate ($Li_2Cr_4O$), calcium dichromate $$(CaCr_2O_7 \cdot 4.5H_2O)$$

or sodium dichromate ($Na_2Cr_2O_7 \cdot 5H_2O$) or sodium dichromate ($Na_2Cr_2O_7 \cdot 2H_2O$).

A completion fluid having a weight of 9.95 lbs. per gal. is prepared by adding sodium dichromate dihydrate to a brine solution having a density of about 9 lbs. per gal. The final concentration of sodium dichromate dihydrate in the brine solution is 20.8 percent by weight.

A completion fluid having a final weight of 9.98 lbs. per gal. is prepared by adding sodium dichromate pentahydrate to a 10 lbs. per gal. aqueous calcium chloride solution. The sodium dichromate concentration in the final fluid amounts to 15.7 percent by weight.

Satisfactory well treating solutions having densities above about 10 lbs. per gal. are prepared by dissolving in aqueous calcium chloride solutions having a density of about 10 lbs. per gal. suitable amounts of sodium dichromate ($Na_2Cr_2O_7 \cdot 2H_2O$) or sodium chromate, anhydrous ($Na_2CrO_4$).

Satisfactory well completion fluids having densities above about 10 lbs. per gal. are prepared by dissolving in aqueous sodium chloride-calcium chloride solution having a density of about 10 lbs. per gal. sodium dichromate ($Na_2Cr_2O_7 \cdot 2H_2O$) or calcium chromate, anhydrous ($CaCrO_4$).

A completion fluid having a final weight of 11.06 lbs. per gal. is prepared from a sodium chloride-calcium chloride brine solution having a weight of about 9.5 lbs. per gal. using potassium dichromate in an amount sufficient to provide a final concentration of 15.44 percent by weight.

Satisfactory well completion fluids in accordance with this invention are prepared by incorporating in a saturated lime [$Ca(OH)_2$] solution a sufficient amount of calcium chromate, anhydrous ($CaCrO_4$) or calcium dichromate ($CaCr_2O_7 \cdot 4.5H_2O$), and, additionally, if desired, an amount of sodium dichromate ($Na_2Cr_2O_7 \cdot 2H_2O$) to yield the desired density.

Further illustrative of the practice of this invention the following well completion fluids have been prepared:

Aqueous solutions of sodium dichromate $$(Na_2Cr_2O_7 \cdot 2H_2O)$$

in water in varying amounts in parts by weight, 100 parts by weight sodium dichromate per 200 parts by weight water, 200 parts by weight sodium dichromate per 200 parts by weight water and 300 parts by weight sodium dichromate per 200 parts by weight water. These aqueous solutions exhibited a density of about 10.3, 11.8 and 12.8 lbs. per gal., respectively.

Additional well completion fluids were prepared by incorporating in a sodium chloride brine solution having a density of about 9.1 lbs. per gal. varying amounts of sodium dichromate ($Na_2Cr_2O_7 \cdot 2H_2O$) as follows: 100 parts by weight sodium dichromate per 200 parts by weight brine solution, 200 parts by weight sodium dichromate per 200 parts by weight brine solution and 300 parts by weight sodium dichromate per 200 parts by weight brine solution. The resulting completion fluids evidenced a density of about 10.9, 12.2 and 12.8, respectively.

The well completion fluids as prepared and/or employed in the practice of this invention are stable at any suitable temperature, ambient, e.g., about 50° F., up to about 200° F. and higher depending upon the well treating conditions and the temperature required to effect the desired solubility of the water soluble chromate, including polychromate.

We claim:

1. A heat stable well completion or workover fluid consisting essentially of an aqueous brine solution having dissolved therein a compatible water soluble inorganic compound selected from the group consisting of a water soluble, chromate, a water soluble polychromate and mixtures thereof, said compound being present in an amount of at least about 15 percent by weight of the solution and to provide a fluid having a density between about 9 and 21 lbs. per gallon.

2. A fluid in accordance with claim 1 wherein said water soluble inorganic compound is present in an amount between 20 percent and 66 percent by weight of the solution.

3. A fluid in accordance with claim 1 wherein said inorganic water soluble compound is an alkali metal chromate.

4. A fluid in accordance with claim 1 wherein said inorganic water soluble compound is an alkali metal dichromate.

5. A heat stable workover fluid consisting essentially of an aqueous solution of a compatible water soluble calcium salt and a compatible water soluble inorganic compound selected from the group consisting of a water soluble chromate, a water soluble polychromate, and mixtures thereof, said compound being present in an amount of at least about 15 percent by weight of the solution and to provide a fluid having a density between about 9 and 21 lbs. per gallon.

6. A fluid in accordance with claim 5 wherein said calcium salt is calcium chloride.

7. In a well completion or workover operation wherein a well completion or workover fluid is introduced into a well bore during a well treating operation, the improvement which comprises employing as said well completion or workover fluid a heat stable aqueous solution consisting essentially of a compatible water soluble inorganic compound selected from the group consisting of a water soluble chromate, a water soluble polychromate and mixtures thereof, said compound being present in an amount of at least about 15 percent by weight of the solution and to provide a fluid having a density between about 9 and 21 lbs. per gallon.

8. A method in accordance with claim 7 wherein said water soluble inorganic compound is a water soluble alkali metal chromate.

9. A heat stable well completion or workover fluid consisting essentially of a solids-free aqueous solution of lime and calcium dichromate, the amount of lime dissolved therein being sufficient to saturate said solution and the amount of calcium dichromate dissolved therein being sufficient to yield a calcium ion concentration of at least 200 parts per million by weight, and a water soluble alkali metal dichromate which is present in an amount of at least about 15 percent by weight of the solution and to provide a fluid having a density between about 9 and 21 lbs. per gallon.

10. In a well completion or workover operation wherein a well completion or workover fluid is introduced into a well bore during a well treating operation, the improvement which comprises employing as said well completion or workover fluid a heat stable solids-free aqueous solution consisting essentially of lime, calcium dichromate and an alkali metal dichromate the amount of lime dissolved therein being sufficient to saturate said solution and the amount of calcium dichromate dissolved therein being sufficient to yield a calcium ion concentration of at least 200 parts per million by weight, said alkali metal dichromate being present in an amount of at least about 15 percent by weight of the solution and to provide a fluid having a density between about 9 and 21 lbs. per gallon.

11. A heat stable well completion or workover fluid consisting essentially of a solids-free aqueous solution containing a water soluble salt selected from the group consisting of sodium chloride, calcium chloride, sodium nitrate, zinc chloride and calcium nitrate dissolved therein together with a compatible water soluble inorganic compound selected from the group consisting of a water soluble chromate, a water soluble polychromate and mixtures thereof, the amount of said water soluble inorganic compound dissolved in said aqueous solution being at least about 15 percent by weight of the solution and sufficient to yield a resulting solution having a weight in the range 10.0 to 14.0 lbs. per gal.

References Cited by the Examiner

UNITED STATES PATENTS

| | | | |
|---|---|---|---|
| 2,802,783 | 8/1957 | Weiss et al. | 252—8.5 |
| 2,805,722 | 9/1957 | Morgan et al. | 252—8.55 |
| 2,868,726 | 1/1959 | Brukner et al. | 252—8.5 |
| 2,894,584 | 7/1959 | Birdwell et al. | 252—8.55 |
| 2,898,294 | 8/1959 | Priest et al. | 252—8.55 |
| 3,000,818 | 9/1961 | Abbott | 252—8.55 |
| 3,007,865 | 11/1961 | Priest | 252—8.55 |

OTHER REFERENCES

Lang: Handbook of Chemistry, 6th ed., pub. 1946, pp. 1301 and 1302.

LEON D. ROSDOL, *Primary Examiner.*

JULIUS GREENWALD, *Examiner.*

H. B. GUYNN, *Assistant Examiner.*